United States Patent [19]

Larson, III

[11] Patent Number: 5,263,004
[45] Date of Patent: Nov. 16, 1993

[54] ACOUSTIC IMAGE ACQUISITION USING AN ACOUSTIC RECEIVING ARRAY WITH VARIABLE TIME DELAY

[75] Inventor: John D. Larson, III, Palo Alto, Calif.

[73] Assignee: Hewlett-Packard Company, Palo Alto, Calif.

[21] Appl. No.: 965,032

[22] Filed: Oct. 21, 1992

Related U.S. Application Data

[63] Continuation of Ser. No. 508,025, Apr. 11, 1990, abandoned.

[51] Int. Cl.$^5$ .................... G03B 42/06; H03H 9/38
[52] U.S. Cl. ......................................... 367/7; 367/103;
73/625; 310/334; 333/144; 333/139;
128/661.01
[58] Field of Search ............... 333/139, 141, 142, 143,
333/144, 149; 310/334, 366; 367/7, 103, 105,
155, 157; 73/625; 128/660.07, 660.08, 660.01,
661.01

[56] References Cited

U.S. PATENT DOCUMENTS

| | | | |
|---|---|---|---|
| 2,517,819 | 8/1950 | Young | 333/144 |
| 2,941,110 | 6/1960 | Yando | 333/144 X |
| 3,200,354 | 8/1965 | White | 333/144 X |
| 3,286,205 | 11/1966 | Ballato | 333/144 |
| 3,293,557 | 12/1966 | Denton | 333/144 X |
| 3,435,383 | 3/1969 | Reggia | 333/158 |
| 3,444,482 | 5/1969 | Becker | 333/18 |
| 3,537,039 | 10/1970 | Schafft | 333/144 |
| 3,723,915 | 3/1973 | Adler et al. | 333/152 |
| 3,869,693 | 3/1975 | Jones | 342/375 |
| 3,950,723 | 4/1976 | Gilmour | 367/103 X |
| 4,005,382 | 1/1977 | Beaver | 367/105 |
| 4,058,003 | 11/1977 | Macovski | 73/609 |
| 4,116,229 | 9/1978 | Pering | 73/626 X |
| 4,140,022 | 2/1979 | Maslak | 73/626 |
| 4,167,753 | 9/1991 | Lynk | 73/611 X |
| 4,173,007 | 10/1979 | McKeighen et al. | 367/103 X |
| 4,180,790 | 12/1979 | Thomas | 367/7 |
| 4,334,432 | 6/1982 | Grill | 73/625 X |
| 4,340,872 | 7/1982 | Alter | 333/152 |
| 4,342,971 | 8/1982 | Councilman et al. | 333/152 |
| 4,401,956 | 8/1983 | Joshi | 333/152 |
| 4,542,653 | 9/1985 | Liu | 367/105 X |
| 4,633,308 | 12/1986 | Dukes et al. | 128/661.01 X |
| 4,829,491 | 5/1989 | Saugeon et al. | 367/103 |
| 4,890,268 | 12/1989 | Smith et al. | 310/334 X |
| 5,062,429 | 11/1991 | Smith et al. | 128/661.01 |

FOREIGN PATENT DOCUMENTS

| | | | |
|---|---|---|---|
| 0118837 | 2/1984 | European Pat. Off. | |
| 149889 | 11/1980 | Japan | 367/103 |
| 189717 | 8/1986 | Japan | 333/139 |
| 467503 | 7/1975 | U.S.S.R. | 310/334 |
| 2011075 | 12/1978 | United Kingdom | |

OTHER PUBLICATIONS

E. Brookner, "Phased Array Radar," Scientific American, Jan. 1985, pp. 94–102.
J. F. Havlice and J. C. Taenzer, "Medical Ultrasonic Imaging: An Overview of Principles and Instrumentation," Proc. I.E.E.E., vol. 67, 1979, pp. 620–642.
Hewlett Packard Journal, Oct. 1983, pp. 1–40.

*Primary Examiner*—Benny T. Lee

[57] ABSTRACT

Apparatus and method for compensating for differences in time at which an incoming acoustic wave is received by an array of acoustic signal receivers to take account of the shape of the incoming wave and the non-zero incidence angle of its approach. Each receiver is provided with a time delay module that introduces a large or coarse scale time delay $\Delta t_L$ plus a small or fine scale time delay $\Delta t_S$, where $\Delta t_L$ is an integral multiple of a coarse scale time interval length $\Delta t_c$ and $\Delta t_S$ may be varied continuously from 0 to a predetermined time interval length $(\Delta t_S)_{max}$ that may be made at least as large as $\Delta t_c$.

8 Claims, 5 Drawing Sheets

ACOUSTIC IMAGE ACQUISITION USING AN ACOUSTIC RECEIVING ARRAY WITH VARIABLE TIME DELAY

This is a continuation of copending application Ser. No. 07/508,025 filed on Apr. 11, 1990, now abandoned.

TECHNICAL FIELD

This invention relates to processing of an acoustic signal arriving at a plurality of receivers and for compensating for a shift in time associated with receipt of this signal at various receivers.

BACKGROUND ART

Acoustical imaging uses ultrasonic signals, generally with frequencies in the 1-10 MHz range, to provide images of adjacent objects by receipt of waves that are reflected from such objects or of waves that have been transmitted through or diffracted from such objects. One version of such imaging is two-dimensional echocardiography, which uses a reconstruction of objects from the echo waves reflected from each object in the path of the transmitted wave that is received by an array of receivers positioned adjacent to, but spaced apart from, the object.

Where a wave traveling in a first medium, having an acoustic impedance $Z_1 = \rho_1 v_1$ ($\rho_1$ and $v_1$ are mass density and propagation velocity, respectively, in medium no. 1) encounters a second medium at normal incidence, the incident wave will be partly reflected from this surface with an amplitude reflection coefficient given by $r = (Z_2 - Z_1)/(Z_2 + Z_1)$, where $Z_2$ is the acoustic impedance of the second medium. This reflection will change with incidence angle. In the soft tissues of a human body, the reflection coefficient varies from $-10$ dB (between fat and muscle) to about $-23$ dB (between kidney and spleen). These correspond to low level reflections of less than 1% so that most of the acoustic energy is transmitted through the interface and is available for imaging structures that lie further from the transmitter. A relatively high magnitude reflection can take place at a bone/muscle interface, which has a reflection coefficient of about 40% ($-4$ dB). In this instance, only about half the energy is transmitted and available for imaging deeper structures.

Another problem in acoustic imaging of relatively soft structures such as body organs and tissues is that propagation of a wave in any particular body organ or tissue has an associated attenuation with a strongly frequency dependent attenuation coefficient. That is, as a wave propagates in such a medium, its intensity $I$ diminishes from its initial value $I_0$, as propagation distance z increases, according to the relation $$I = I_0 \exp[-2\alpha z], \quad (1)$$

where the attenuation coefficient $\alpha$ increases approximately linearly with temporal frequency f of the wave: $\alpha(f) = \alpha_0 + \alpha_1 f$ with $\alpha_o$ being a constant approximately equal to 0.1 and $\alpha_1$ being a scaling factor approximately equal to 1 dB/cm-MHz. Thus, for example, a three MHz acoustic wave that has traveled 20 cm through soft tissue has an intensity that is 60 dB (a factor of $10^{-6}$) below its initial intensity level; and if the intensity is increased to f=10 MHz, this acoustic beam would be 200 dB below its initial intensity level. For this reason, acoustic waves of lower frequency, of the order of 1-5 MHz, are used for imaging structures deep in the body and higher frequency acoustic waves, f=10 MHz, are used for imaging structures close to a surface within the body.

The velocity of propagation of a wave with a nominal frequency of 1-10 MHz within the body ranges from $1.41 \times 10^5$ to $1.59 \times 10^5$ cm/sec for various body organs and is not strongly frequency dependent in this range. An average value for wave propagation velocity $v_b$ in the human body of $1.54 \times 10^5$ cm/sec is often used for modeling purposes. An exception to use of this average value is human bone, with a wave propagation velocity of $4.08 \times 10^5$ cm/sec and with a characteristic impedance that is about 5 times that of the soft organs and tissues within the human body.

Where two or more adjacent organs or tissue interfaces are acoustically imaged within a human body, if these objects lie at different distances from the source or transmitter of the wave, the reflected waves will arrive at the receiver at different times and possibly from different directions relative to a center line that defines the orientation of the array of signal receivers. This has at least two consequences. First, the incoming wave from any one object may not be planar and may arrive from a direction that defines a non-zero incidence angle relative to the receiver array. Second, two incoming waves produced by two spaced apart objects will generally arrive at different times, with different incidence angles and with different shapes for the incoming waves. Other workers in this field often call for dynamical focussing, whereby each receiver in the receiver array is given a variable time delay that is commensurate with the direction from which a given incoming wave arrives. If two such waves are separated sufficiently in time, one set of time delays associated with an array of receivers can be replaced by a second set of time delays in the time interval between arrival of the first incoming wave and arrival of the second incoming wave. This is discussed by Brookner in "Phased Array Radar," Scientific American (January, 1985) pp. 94-102.

An example of this approach is disclosed in U.S. Pat. No. 4,116,229, issued to Pering for acoustic imaging apparatus. A time delay associated with a given receiver or transceiver or transducer is decomposed into a first large time delay contribution set by a tap on a master delay line and a second, smaller incremental time delay that is controlled by a set of controllable switches. The total time delay includes the first and second contributions to time delay and the incremental time delays can be changed at a predetermined time by use of the switches. A similar idea is disclosed in U.S. Pat. No. 4,140,022, issued to Maslak, in which focussing occurs by adjusting the phases of the waves. A mixer, in which the phase of the local oscillator is varied, effects the focussing phase variation in the signal.

Jones, in U.S. Pat. No. 3,869,693, discloses a beam scanner for a plane wave arriving at a non-zero incidence angle relative to a linear array (assumed vertical) of transducers. The transducers individually sense the arrival, at possibly different times, of the wave front. Each transducer is provided with a multi-component delay line that includes: (1) a first component that introduces a fixed time delay $\Delta t_1$ that progressively increases as one moves along the linear array from the topmost transducer to the bottommost transducer; (2) a second component that introduces a variable time delay $\Delta t'_2$, wherein the maximum extent of the variable range of $\Delta t'_2$ progressively decreases as one moves along the linear array from the topmost transducer to the bottommost transducer, wherein the minimum extent of the variable range is zero, wherein $\Delta t'_2$ is variable over its range in seven equal time increments; and (3) a third component that introduces a variable time delay $\Delta t''_2$, wherein the maximum extent of the variable range of $\Delta t''_2$ is a fractional $\frac{1}{8}$ths of one of the seven equal increments of the respective value of $t'_2$, wherein $\Delta t''_2$ is variable over its range in three increasingly large time increments, the first increment being 1/7th of its total range, the second increment adding another 2/7ths of its total range and the third increment adding the final 4/7ths of its total range. The second and third time delay components are used to provide a combined time delay, of amount given by the sum $\Delta t_c = M \Delta t'_2 + (m_1/2 + m_2/4 + m_3/8) \Delta t''_2$ ($M = 0, 1, 2, \ldots, 7$; $m_1$, $m_2$, $m_3$ each $= 0$ or $1$ independently), for a signal arriving at a transducer. It appears that the combination time delay $\Delta t_c$ is to be combined with the fixed time delay $\Delta t_1$ to obtain the net time delay introduced at a given transducer. The net time delay introduced at a given transducer is not continuous but has 64 discrete values, corresponding to the choices of the four integer coefficients M, $m_1$, $m_2$ and $m_3$ of the combination time delay $\Delta t_c$.

Time delay of a signal transmitted by a first transducer and received by a second transducer may be introduced by insertion of a piezoelectric element extending between the two transducers. In U.S. Pat. No. 3,537,039, issued to Schafft, an electrical field is applied transversely to control the time delay of torsional vibrations of the piezoelectric material that carry the signal from the first transducer to the second transducer.

In U.S. Pat. No. 4,342,971, issued to Alter, application of a transverse electrical field alters the length of the piezoelectric element inserted between the first and second transducers and provides a controllable time delay for a signal sent between the two transducers. This approach is also disclosed in U.S. Pat. No. 4,401,956, issued to Joshi. In all these patents, the variable time delay introduced by the electrical field applied to the piezoelectric element appears to be at most a few percent of the time delay associated with the piezoelectric element with no electrical field applied.

Where the means for providing time delay are explicitly disclosed in the prior art, these devices appear to be rather large and electronically complex so that only a modest number of receivers can be provided with variable time delays. Often, the means of providing such variable time delay is not disclosed.

In order to provide adequate sampling of an incoming wave for any incidence angle from 0° to 90°, the receivers in the array should be spaced apart by no more than one half the wave length, $\lambda$, corresponding to the central frequency of the incoming wave, according to the Nyquist theory of (under) sampling. If the central frequency is chosen to be $f = 5$ MHz and a propagation velocity of $v = 1.54 \times 10^5$ is assumed, the receiver-to-receiver spacing should be $\lambda/2 = v/2f = 154$ $\mu$m or smaller. A one-dimensional array having a modest number $N = 100$ such receivers would require that all these receivers be approximately linearly aligned and uniformly spaced along a distance of about 1.5 cm. For a two-dimensional array with $N = 10^4$ such receivers, this many receivers would have to be positioned in a rectangle or similar figure of area approximately 2.25 cm$^2$. It is unlikely that this could be done for the receivers with variable time delay discussed in the previous literature.

What is needed is acoustic imaging apparatus that will allow introduction of controllable, variable time delay in the signal produced at each receiver and will allow a large number of such receivers to be positioned in a very small length or small area representing the receiver array. Such receivers should, preferably, also allow the time delay at any one receiver to be changed in a time of the order of microseconds or less in order to provide adequate discrimination between two incoming acoustic waves corresponding to two different objects to be imaged by the apparatus.

SUMMARY OF THE INVENTION

These needs are met by apparatus that includes a plurality of signal receivers of very small size, each receiver having a time delay means connected thereto for introducing a separately determined time delay into the incoming signal received at that receiver and for changing the time delay at a predetermined time in a time interval of no more than one microsecond.

The time delay includes a large or coarse time delay contribution and a fine time delay contribution, where one coarse time delay may serve a plurality of receivers and can be changed at a predetermined time. Each fine time delay is specific to one or a few receivers and can also be changed at a predetermined time independently of the time at which the coarse time delay contribution is changed. The time delayed signals from the receivers are received by a signal summation means that forms the sum of such signals, and a signal detector receives this sum and presents it as an electrical signal in some form, for example, as a graph on a screen of a cathode ray terminal. The fine time delay at a given receiver may be produced by propagating the signal receiver thereat through a length of piezoelectric crystal that has a pair of electrical/mechanical energy transducers positioned at two longitudinal ends of the transducer.

Two parallel electrodes are positioned on a pair of side surfaces of the crystal to provide a transverse electrical field whose instantaneous transverse electric field intensity determines the velocity of propagation of a piezoelectrically produced mechanical wave that travels from one transducer to the other transducer. The electrical field intensity produced by the two electrodes can be changed in a time of the order of one microsecond so that the fine time delay introduced into the signal received at this receiver can be changed quickly and controllably. Each piezoelectric crystal may have a transverse width or distance between the two electrodes of the order of 200 micrometers or less so that establishment of a new electric field intensity within the crystal is easily attained in a time interval of the order of one microsecond. The spacing of adjacent receivers, whether arranged in a one-dimensional array or in a two-dimensional array, is $\lambda/2$ or less, where $\lambda$ is the wavelength associated with the central frequency of the incoming acoustic wave.

BEST MODE FOR CARRYING OUT THE INVENTION

Figure 1:
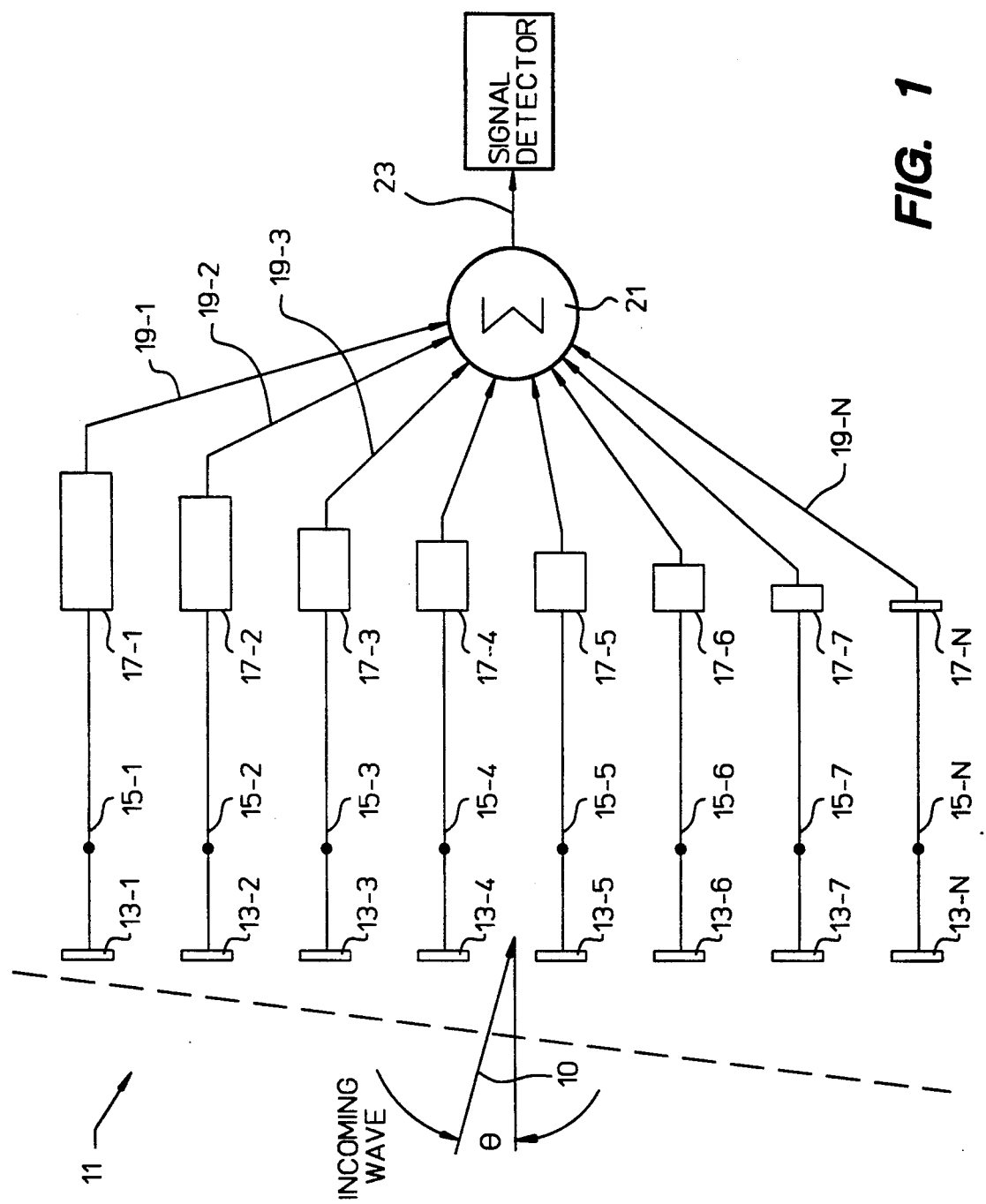
FIG. 1 is a plan view of the overall arrangement of the invention in a one-dimensional embodiment.

With reference to FIG. 1, a plane wave 10 arrives at the receiver apparatus 11 at an incidence angle Θ relative to a plane containing a one-dimensional array of receivers, 13-1, 13-2, 13-3, ..., 13-N. The one dimensional array of receivers can be linearly aligned or can be aligned along a curve laying in a plane. Each receiver of the one dimensional array of receivers receives a signal indicating that an incoming acoustic wave is present and the time that this signal is received is different for each receiver, for example; 13-1 receives this signal at time $t_1$, 13-2 receives this signal at time $t_2$ with $t_1 < t_2$, 13-3 receives this signal at time $t_3$ with $t_1 < t_2 < t_3$, ..., 13-N receives this signal at time $t_N$ with $t_1 < t_2 < t_3 < ... < t_N$. The signal received at each receiver is sent on its respective transport line to its respective time delay module where an independent time delay is added to the signal, wherein the independent time delay is less than a maximum time delay $\Delta T_d$ with $\Delta T_d$ being equal to $t_N$ minus $t_1$, for example; the signal received at receiver 13-1 is sent on a first transport line 15-1 to a time delay module 17-1 that can introduce an independent time delay in the arriving signal of as much as a maximum time delay $\Delta T_d$ where $\Delta T_d = t_N - t_1$. Similarly, the signal received at receiver 13-2 is sent on a first transport line 15-2 to a time delay module 17-2 that can introduce another independent time delay in the arriving signal. Likewise, the signal received at receiver 13-3 is sent on a first transport line 15-3 to a time delay module 17-3 that can introduce yet another independent time delay in the arriving signal. This continues throughout the array and ultimately, the signal received at receiver 13-N is sent on a first transport line 15-N to a time delay module 17-N that can introduce still where yet another independent time delay in the arriving signal. The maximum time delay $\Delta T_d$ is the same for each of the time delay modules.

Each time delay module can introduce an independent time delay $\Delta t$ satisfying $0 < \Delta t < \Delta T_d$. The time delays introduced at the time delay modules may be such that the received signal emitted by each of the time delay modules issues at substantially the same time so that the initial difference in time between adjacent receivers is exactly compensated for by the respective time delays introduced by the time delay modules. The signal received by the time delay modules, with the appropriate time delay introduced, is then issued on a second transport line; and the collection of signals carried on the transport lines 19-1, 19-2, 19-3, ..., 19-N is received at a signal summation and detection device 21 that sums these signals and produces an electrical signal representing this sum. This sum signal is then issued on a third transport line 23 for subsequent processing or presentation graphically or numerically.

Each time delay module in FIG. 1 introduces a coarse or large increment of time delay $\Delta t_L$ and a fine or small increment of time delay $\Delta t_S$ according to the invention, where $\Delta t_L$ is approximately a multiple of 50 nsec and $\Delta t_S$ is defined on a continuum (assumes a continuous range of values) or is approximately a multiple of a small time unit such as 1 nsec.

Figure 2:
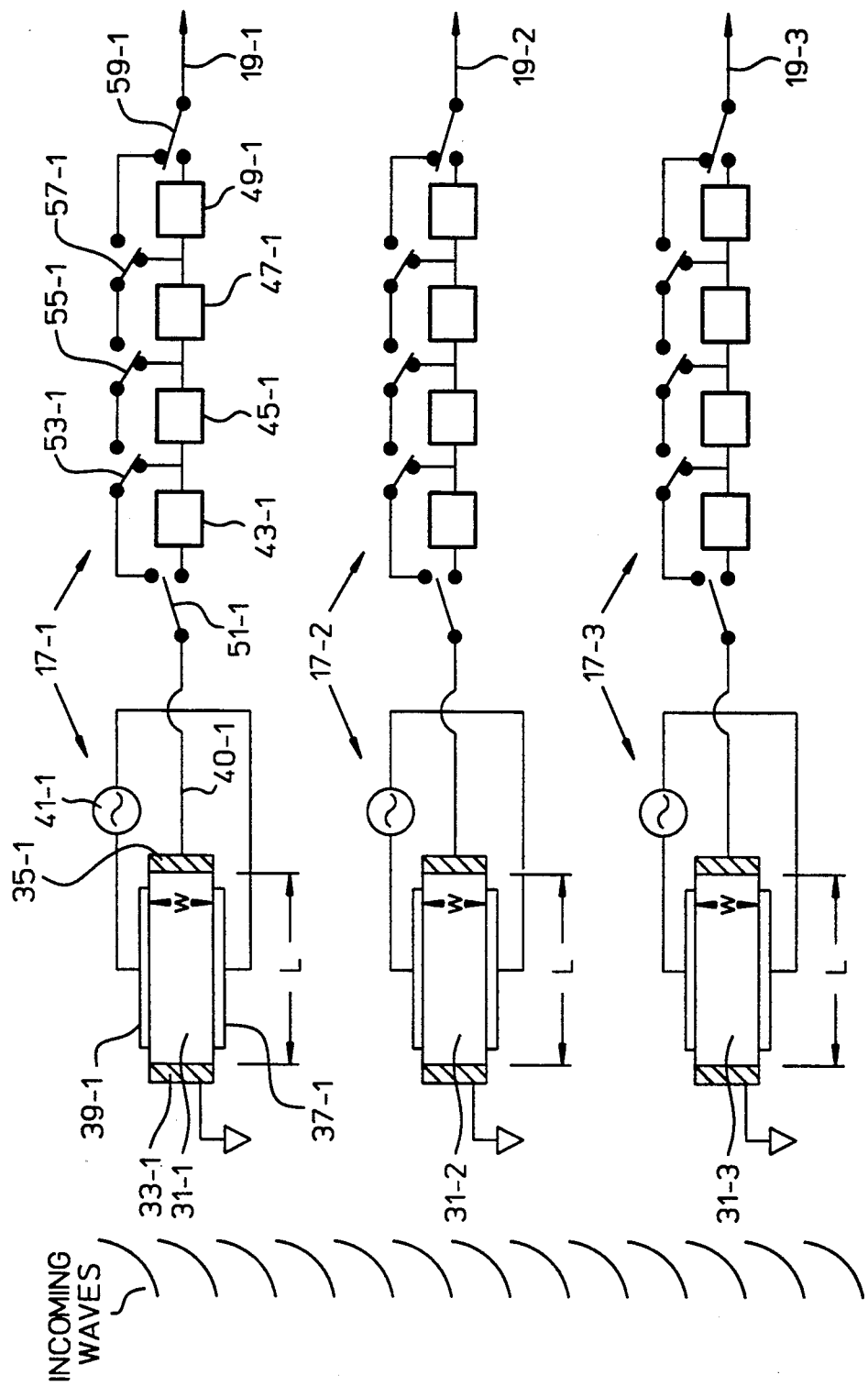
FIG. 2 is a plan view of the time delay means in FIG. 1 according to one embodiment of the invention.

FIG. 2 illustrates one embodiment of three of the time delay modules 17-1, 17-2, and 17-3, each associated with piezoelectric crystals 37-1, 37-2, and 37-3, respectively. For example, the time delay module 17-1 includes a piezoelectric crystal 31-1, preferably of rectangular shape with longitudinal length L and transverse width W, with two signal electrodes 33-1, L and transverse width W, with two signal electrodes 33-1 and 35-1 positioned at two longitudinal ends of the crystal 31-1. Two control electrodes 37-1 and 39-1 are positioned at two transverse faces of the crystal so that these electrodes are spaced apart and approximately parallel and facing one another. The two control electrodes 37-1 and 39-1 are connected by a variable voltage source 41-1 so that the voltage difference (up to 300 volts) between the two electrodes can be quickly changed in a time interval of the order of one microsecond and then held at a constant voltage difference level for a certain interval of time to cause a prescribed time delay. The first signal electrode 33-1 is grounded and the second signal electrode 35-1 is connected to an internal transport line 40-1 at one end and to a first switch 51-1 at the other end of the line 40-1. The piezoelectric crystal 31-1, the signal electrodes 33-1 and 35-1, the two control electrodes 37-1 and 39-1, the variable voltage source 41-1 and the output line 40-1 together make up the portion of the time delay module 17-1 that provides a fine or small increment time delay. A second time delay module 17-2 and a third time delay module 17-3 are similarly constructed, respectively including a second piezoelectric crystal 31-2 and a third piezoelectric crystal 31-3. If a non-zero electrical field is imposed on the crystal 31-1 in a transverse direction, the velocity of propagation of an acoustic wave within the crystal in a longitudinal direction will be changed by an amount that is approximately proportional to the strength of the transverse electrical field, including the polarity of the electrical field. Table 1 sets forth some of the relevant piezoelectric parameters for different piezoelectric crystals that are available today. Suitable materials include lead zirconate titanate, lead titanate and other ferroelectric ceramic materials known to those with skill in the art that exhibit piezoelectricity with a velocity of sound that is voltage-dependent.

TABLE I

| Crystal Parameter | Relevent Piezoelectric Crystal Parameter | | | | |
|---|---|---|---|---|---|
| | Clevite Ceramic B | Clevite PZT-4 | Clevite PZT-5A | Clevite PZT-5H | Clevite PZT-8 |
| Density ($\rho$) in gm/cm$^3$ | 5.55 | 7.5 | 7.75 | 7.5 | 7.6 |
| Prop. Velocity (v) at 0 psi in km/sec | 4.45 | 2.93 | 2.62 | 2.54 | 3.08 |
| Fractional Change of Prop. Velocity at p = 1000 psi | −.0085 | −.0085 | −.052 | — | — |
| Fractional Change of Prop. Velocity at p = 2000 psi | −.0183 | −.0183 | −.082 | — | — |
| Bulk Compliance ($s_{11}^E$) in M-sec$^2$/Kgm | $9.1 \times 10^{-12}$ | $15.5 \times 10^{-12}$ | $18.8 \times 10^{-12}$ | $20.7 \times 10^{-12}$ | $13.9 \times 10^{-12}$ |
| Bulk Compliance | $8.6 \times 10^{-12}$ | $12.3 \times 10^{-12}$ | $16.4 \times 10^{-12}$ | $16.5 \times 10^{-12}$ | $11.1 \times 10^{-12}$ |

TABLE I-continued

| Crystal Parameter | Relevent Piezoelectric Crystal Parameter | | | | |
| --- | --- | --- | --- | --- | --- |
| | Clevite Ceramic B | Clevite PZT-4 | Clevite PZT-5A | Clevite PZT-5H | Clevite PZT-8 |
| $(s_{11}{}^E)$ in M-sec$^2$/Kgm | | | | | |

The velocity of longitudinal wave propagation in a piezoelectric crystal with transverse poling is given by $$v = (\rho S_{11}{}^E)^{-\frac{1}{2}}. \quad (2)$$

Wherein v is the velocity of propagation of the longitudinal wave in a piezoelectric crystal, $\rho$ is density of the crystal, $S_{11}{}^E$ is the bulk compliance in the 11 orientation. The phase shift experienced by a wave at frequency f as it propagates longitudinally a distance L through the crystal is given by $\phi$ (in degrees) = $-360°$ (fL/v). The fractional change in phase shift $\phi$ with a change in the wave and crystal variables f, L and v becomes $$\Delta\phi/\phi = \Delta f/f + \Delta L/L - \Delta v/v. \quad (3)$$

Wherein, $\Delta\phi/\phi$ is the change in phase over the total phase, $\Delta f/f$ is the change in frequency over the frequency, $\Delta L/L$ is the change in length over the length and $\Delta v/v$ is the change in velocity over the velocity. For a nominal propagating velocity in the PZT-5A ceramic of approximately v=3 Km/sec, a bar length of 0.176 cm (assumed fixed), and a signal frequency of f=5 MHz, a wave propagating in the medium at p=1000 psi experiences a total phase of $\phi$=1056°. A pressure change $\Delta p$=2000 psi produces a fractional bulk compliance shift of $-0.17$, which corresponds to a fractional phase shift change of $$\Delta\phi/\phi = -\Delta v/v = S_{11}{}^E/2S_{11}{}^E = 0.085. \quad (4)$$

The stress T required to produce the required change $S_{11}{}^E$ is T=1.38×10$^8$ Newtons/M$^2$. The electric field strength required to produce the required change in $S_{11}{}^E$ is then $$\begin{aligned} E_1 &= S_{11}^E T/d_{31} \\ &= -(18.8 \times 10^{-12})(1.38 \times 10^7)/(1.71 \times 10^{-10}) \\ &= 1.51 \times 10^4 \text{ volts/cm} \end{aligned} \quad (5)$$

Wherein, $E_1$ is the electric field strength, $S_{11}{}^E$ is the bulk compliance in the 11 orientation, T is the associated crystal stress and $d_{31}$ is the change in distance in the 31 orientation. The corresponding voltage difference V across the crystal of width W=0.0127 cm becomes $$\text{voltage difference } V = E_1 W = 193 \text{ volts.} \quad (6)$$

This corresponds to a 90 degree change in phase shift and a voltage sensitivity factor of $$\frac{\Delta\phi}{\Delta V} = 0.47 \text{ degrees/volts.} \quad (7)$$

Wherein $\Delta\phi/\Delta V$ is the change in phase over the change in voltage. The phase shift change, or equivalently the time delay, introduced in a wave that travels the length of a piezoelectric crystal can thus be controlled using an applied voltage difference between the two electrodes.

The maximum associated time delay for an approximate propagation velocity of v=3×10$^5$ cm/sec and a length of L=0.176 cm for the voltage difference of 193 volts is $$(\Delta t)_{max} = \left(\frac{L}{v}\right)\left(\frac{-\Delta v}{v}\right)/\left(1 + \frac{\Delta v}{v}\right) = 52 \text{ nsec.} \quad (8)$$

The actual time delay $\Delta t$ may be varied continuously and approximately linearly from 0 to 50 nsec by varying the voltage difference between the electrodes.

The total time delay of the module 17 may then consist of a fine scale or small contribution $\Delta t_S$ ($0 \leq \Delta t_s \leq 50$ nsec) plus a coarse scale or large contribution $\Delta t_L$, where $\Delta t_L$ is an integral multiple $M\Delta t_C$ (M=0, 1, 2, ...) of a time delay $\Delta t_C$ of some convenient size such as 25 nsec or 50 nsec. The upper limit for $\Delta t_S$ may be made any time interval within reason by appropriate choice of the crystal material (and thus propagation velocity v) and of the crystal length L. The resolution of the fine scale time delay may be one nsec, or even smaller if desired.

Figure 3A:
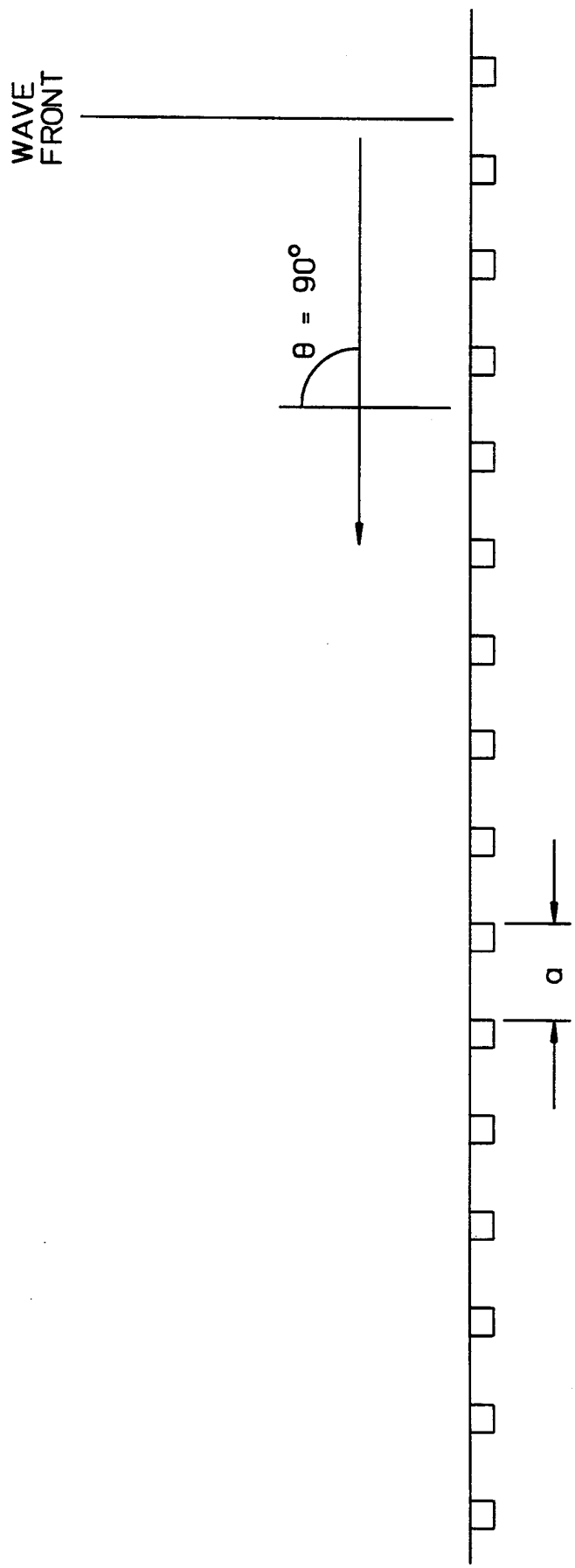
FIG. 3A is a schematic view illustrating a wave sweeping across a planar array of receivers at an incidence close to $\Theta = 90°$.
Figure 3B:
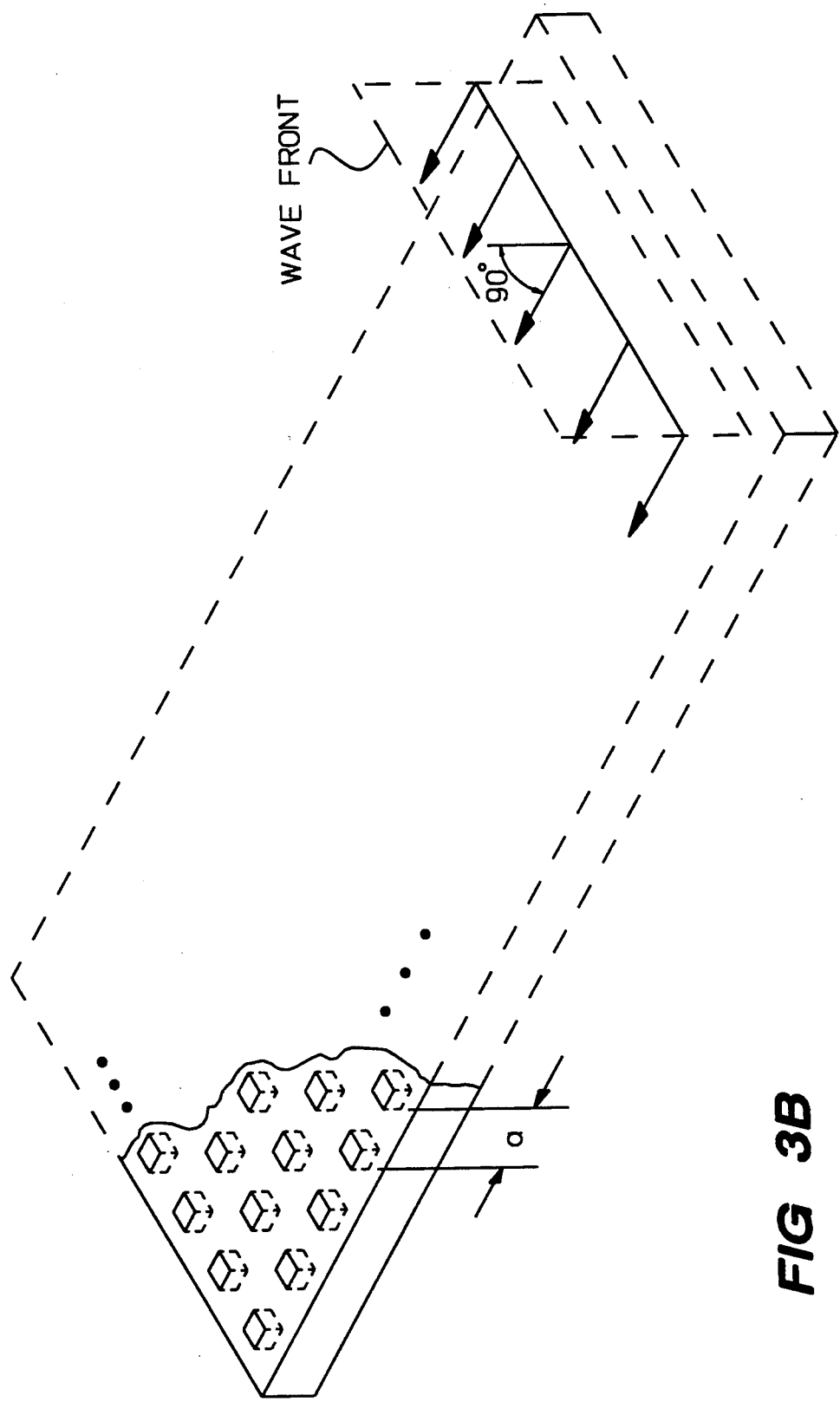
FIG. 3B is an isometric view of the planar array illustrated in FIG. 3A.

If the wave propagation velocity in the body is taken to be $v_b = 1.54 \times 10^5$ cm/sec, a frequency of f=5 MHz will produce an associated wavelength of $\lambda = 308$ $\mu$m, as noted above. If the element-to-element spacing on the array of receivers is $a = \lambda/2 = 154$ $\mu$m, a wave front moving approximately parallel to a plane containing the array of receivers will require a time interval of approximately $$(\Delta t_{sp})_{max} = a/v = \frac{1}{2}f = 100 \text{ nsec}$$

to move from one receiver to an adjacent receiver, and this orientation corresponds to a wave incidence angle of 90° as illustrated in FIGS. 3A and 3B. More generally, for an incidence angle of $\Theta$ ($0° \leq \Theta \leq 90°$) the time interval length $\Delta t_{sp}$ will become $$\Delta t_{sp} = (\tfrac{1}{2}f) \sin \Theta \quad (10)$$

so that the choice $\Theta = 30°$ will produce a time interval length $\Delta t_{sp} = 50$ nsec.

Where longitudinal poling, rather than transverse poling, is used in a piezoelectric crystal, the velocity of wave propagation becomes $$v = (\rho S_{33}{}^E)^{-\frac{1}{2}} \quad (11)$$

Wherein v is the velocity of wave propagation, $\rho$ is the density and $S_{33}{}^E$ is the bulk compliance in the 33 orientation. The fractional phase shift for a pressure change $\Delta p = 2000$ psi, given in Eq. (4), is unchanged, and the electric field strength $E_1$ required to produce the change in $S_{33}{}^E$ becomes $$E_1 = S_{33}{}^E T/d_{31} = 1.32 \times 10^4 \text{ volts/cm.} \quad (12)$$

The corresponding voltage difference V across the crystal and the voltage sensitivity become $$V = E_1 W = 167 \text{ volts}, \quad (13)$$

$$\frac{\Delta \phi}{\Delta V} = 0.54 \text{ degrees/volts}, \quad (14)$$

for the transverse polling situation. The maximum time delay $(\Delta t)_{max}$ given in Eq. (9) remains unchanged at 52 nsec.

A small group of N adjacent or consecutive receivers will have associated time delays $t_1, t_2, \ldots, t_n$ that can be expressed as $$\Delta t_i = (\Delta t_S)_i + (\Delta t_L)_i$$

where $$(\Delta t_L)_1 = (\Delta t_L)_2 = \ldots = (\Delta t_L)_N.$$

Otherwise stated, a group of adjacent or consecutive receivers may be chosen for which the coarse scale time delay contributions $\Delta t_L$ are all the same and the receiver time delays differ, if at all, only in the small scale contribution to time delay, $\Delta t_S$. In FIG. 2 with N=3, this would be implemented by tying together: the switch 51-1 in the module 17-1 corresponding switches in modules 17-2 and 17-3; the switch 53-1 in module 17-1 and the corresponding switches in the modules 17-2 and 17-3; the switch 55-1 in the module 17-1 and the corresponding switches in modules 17-2 and 17-3; the switch 57-1 in module 17-1 and the corresponding switches in modules 17-2 and 17-3; and the switch 59-1 in module 17-1 and the corresponding switches in modules 17-2 and 17-3. Each of the coarse time delay devices 43-1, 45-1, 47-1 and 49-1 could be arranged to introduce a basic coarse time delay $\Delta t_c$, which could be 50 nsec, 100 nsec, 150 nsec or some other convenient number. The total coarse time delay would then be an integral multiple $N \Delta t_c$ of this basic coarse time delay $\Delta t_c$. The fine scale time delay $\Delta t_S$ for the signals propagating on the signal lines 19-1, 19-2 and 19-3 would then be introduced by the respective piezoelectric crystals 31-1, 31-2 and 31-3 and associated electrode pairs.

Figure 4:
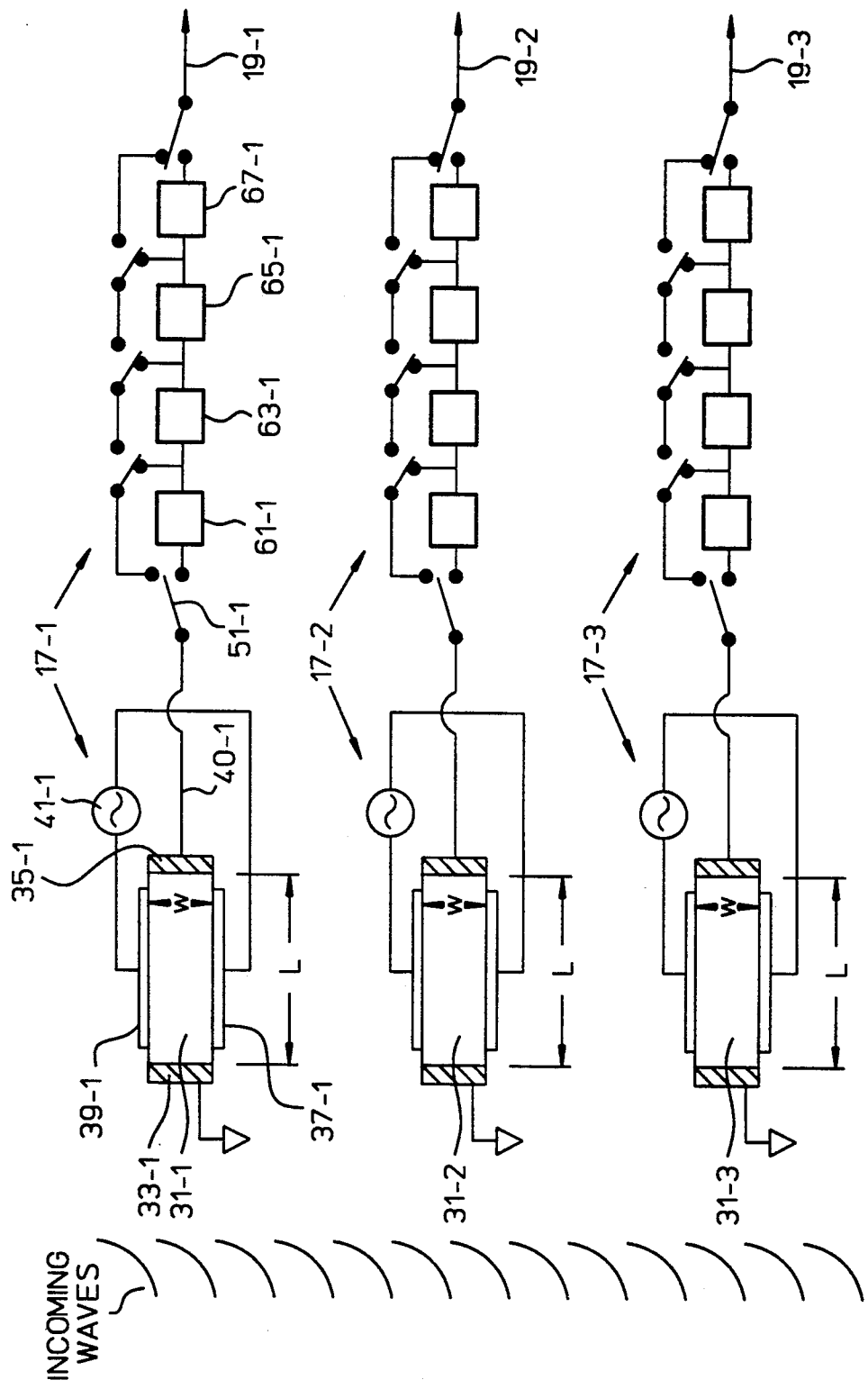
FIG. 4 is a plan view of the time delay means in FIG. 1 according to another embodiment of the invention.

Alternatively, as shown in FIG. 4, the coarse time delay sub-modules 61-1, 63-1, 65-1 and 67-1 could introduce respective coarse time delays of $\Delta t_c, 2\Delta t_c, 4\Delta t_c$ and $8\Delta t_c$ so that the total coarse time delay for the system becomes $$\Delta t_L = \frac{n}{2^N} \Delta t_c \ (n = 0, 1, 2, \ldots, 2^N - 1), \quad (50)$$

with N=4 in FIG. 4.

The control voltages applied could be arranged in digital steps in a binary fashion, or could be applied as a continuous analog control. The coarse time delay modules shown in FIGS. 2 and 4 may each be a piezoelectric element with a transducer at each end, or may be some other device that introduces a fixed time delay into signal propagation.

List of Reference Items Used in Drawings

FIG. 1:

| | |
|---|---|
| 10 | Plane acoustic wave moving toward receiver |
| 13-i (i = 1, 2, ..., N) | Acoustic wave receiver |
| 15-i (i = 1, 2, ..., N) | Signal transport line, connected to receiver 13-i |

-continued
List of Reference Items Used in Drawings

| | |
|---|---|
| 17-i (i = 1, 2, ..., N) | Time delay module connected to signal transport line 15-i |
| 19-i (i = 1, 2, ..., N) | Second signal transport line, connected to time delay module 17-i |
| 21 | Signal summation/detection device, connected to lines 19-i (i = 1, 2, ..., N) |
| 23 | Third signal transport line, connected to summation/detection device output terminal |
| Θ | Incidence angle of incoming acoustic wave |

FIG. 2:

| | |
|---|---|
| 31-i (i = 1, 2, 3) | Piezoelectric crystal |
| 33-1, 35-1 | Two signal electrodes at opposite ends of PZ crystal 31-1 |
| 37-1, 39-1 | Two voltage control electrodes facing one another transversely across the PZ crystal 31-1 |
| 41-1 | Variable voltage source connected to electrodes 37-1, 39-1 |
| 40-1 | Internal transport line connected to electrode 35-1 |
| 43-1, 45-1, 47-1, 49-1 | Equal time interval delay modules connected in series by switches |
| 51-1, 53-1, 55-1, 57-1, 59-1 | Signal switches in time delay module 17-1 |

FIG. 3:

| | |
|---|---|
| a | Nearest neighbor spatial separation in planar receiver array |

FIG. 4:

| | |
|---|---|
| 61-1, 63-1, 65-1, 67-1 | Binary time interval delay modules connected in series by switches 51-1, etc. |

I claim:

1. Apparatus for receiving and processing an incoming broadband acoustic signal, the apparatus comprising:

a plurality of acoustic signal receiver means for receiving the incoming acoustic signal;

respective means, coupled to each of the signal receiver means, for producing a separately determined variable time delay of the acoustic signal as the acoustic signal is received by each signal receiver means, thereby generating a respective delayed acoustic signal;

signal summation means coupled to each of the time delay means, for sensing each of the respective delayed acoustic signals and for providing an electrical sum signal; and a signal detector coupled to the signal summation means, for receiving the sum signal and for detecting the sum signal.

2. Apparatus according to claim 1, wherein said signal receiver means are arranged in a two-dimensional planar array for receiving the acoustic signal.

3. Apparatus according to claim 1, wherein said signal receiver means are arranged in a one-dimensional array for receiving the acoustic signal.

4. Apparatus for receiving and processing an incoming broadband acoustic signal, the apparatus comprising:

a plurality of acoustic receiver means, each receiver means including a respective piezoelectric crystal for receiving the acoustic signal, thereby introducing the acoustic signal to propagation within the respective crystal; and respective means, coupled to each receiver means, for producing a respective separately determined variable fine time delay of the acoustic signal as the acoustic signal propagates within the respective one of the crystals, thereby producing a respective fine time delay acoustic signal.

5. An apparatus as in claim 4 wherein each fine time delay means is operative for changing the variable fine time delay within a time of approximately one microsecond.

6. An apparatus as in claim 4 further comprising:

respective coarse delay means, coupled to each of the piezoelectric crystals of the acoustic receiver means, for sensing the respective fine time delayed acoustic signal and for generating a respective electrical signal having a combined fine and coarse time delay;

a summation means coupled to the coarse time delay means for producing a summation of the electrical signals having combined fine and coarse time delay; and a signal detector means connected to the signal summation means and operative for detecting the summation of signals.

7. An apparatus as in claim 4 wherein said plurality of fine time delay means each includes a respective pair of control electrodes, each piezoelectric crystal being connected between the respective one pair of control electrodes at opposing transverse faces of the crystal, each pair of control electrodes being coupled in parallel to a respective one of a plurality of independently variable voltage sources for producing the separately determined fine time delay in the acoustic signal as the acoustic signal propagates within the respective crystal.

8. An apparatus as in claim 7 wherein said array of receivers is arranged as a two dimensional array of receivers.

* * * * *